(12) United States Patent
Adachi

(10) Patent No.: US 6,836,458 B2
(45) Date of Patent: Dec. 28, 2004

(54) RECORDING APPARATUS FOR OPTICAL RECORDING MEDIA

(75) Inventor: Masatoshi Adachi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 487 days.

(21) Appl. No.: 10/084,668

(22) Filed: Feb. 28, 2002

(65) Prior Publication Data

US 2002/0126596 A1 Sep. 12, 2002

(30) Foreign Application Priority Data

Mar. 1, 2001 (JP) ........................................ 2001-056274

(51) Int. Cl.$^7$ ................................................ G11B 5/76
(52) U.S. Cl. ................................ 369/59.26; 369/47.31; 369/53.34; 369/124.07
(58) Field of Search .......................... 369/32.01, 33.01, 369/47.28, 47.31, 47.35, 53.12, 53.31, 53.33, 53.34, 53.35, 53.36, 59.17, 59.19, 59.21, 59.25, 59.26, 124.07

(56) References Cited

U.S. PATENT DOCUMENTS 6,341,110 B1 * 1/2002 Tawaragi .................... 369/47.2
6,552,983 B1 * 4/2003 Yoshida et al. ........... 369/53.12
6,603,726 B1 * 8/2003 Yoshida et al. ......... 369/124.01

* cited by examiner

*Primary Examiner*—Paul W. Huber
(74) *Attorney, Agent, or Firm*—Morgan, Lewis & Bockius LLP

(57) ABSTRACT

A recording apparatus includes a gate signal generator for generating a gate signal in accordance with the data signal; a pre-pit signal generator for generating a pre-pit signal from a signal read from the recording medium; a gate circuit for generating a pre-pit pulse train by allowing the pre-pit signal to pass therethrough in response to the gate signal; a pulse extractor for extracting pulses of predetermined waveform from the pre-pit pulse train; and a synchronization signal generator for generating a recording synchronization signal based on the pulses of predetermined waveform.

4 Claims, 9 Drawing Sheets

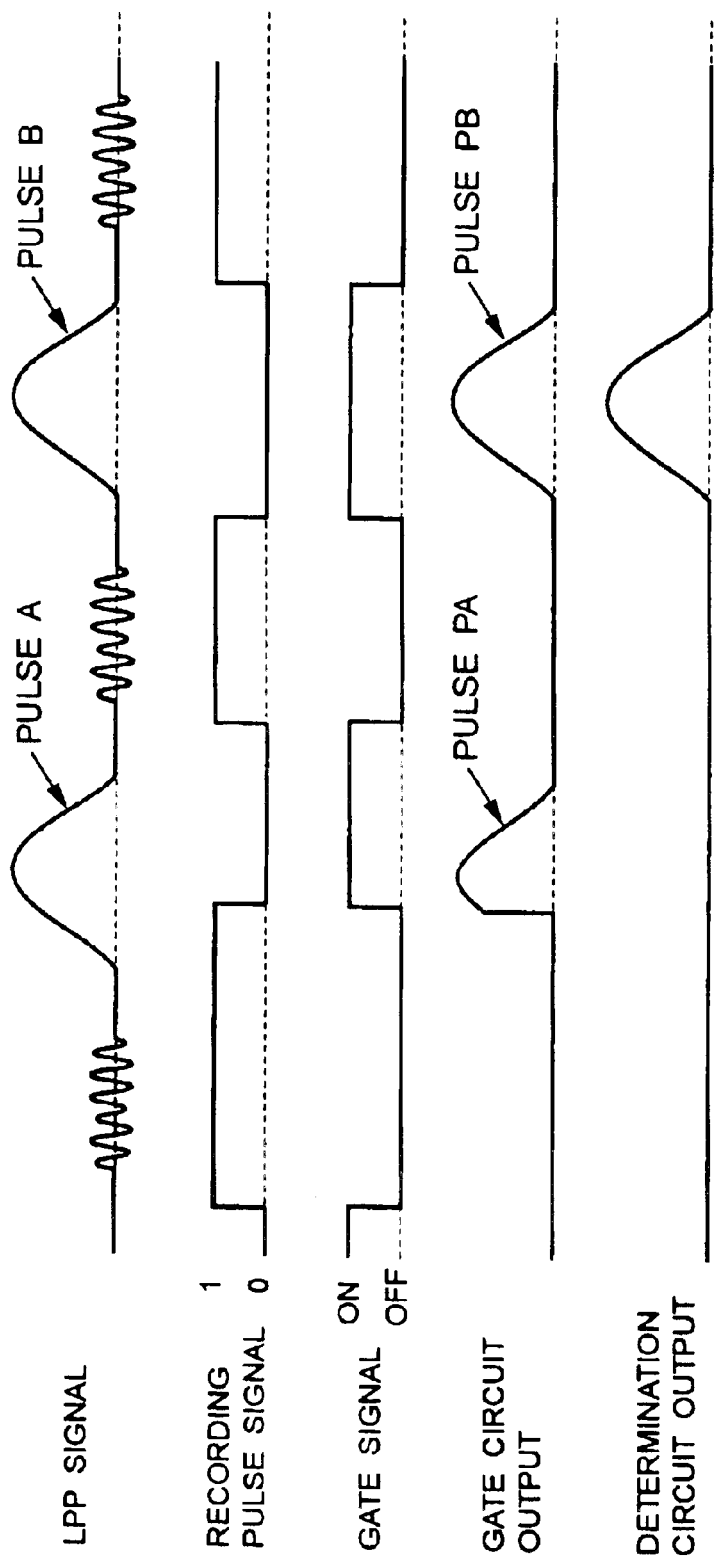

RECORDING APPARATUS FOR OPTICAL RECORDING MEDIA

BACKGROUND OF THE INVENTION

1. Field of the Invention

The present invention relates to a recording apparatus for an optical recording medium, and more particularly to a recording apparatus for an optical recording medium in which pre-pits that carry recording position information are formed in advance.

2. Description of the Related Art

At present, an optical recording medium having a recording capacity of several gigabytes is in practical use or under development such as a DVD-R (Digital Versatile Disc-Recordable) or a rewritable DVD-RW (DVD-Re-recordable). The remarkable improvement of the performance of the mass storage digital optical recording medium and the reproducing apparatus has made it possible to record a vast amount of data with a high quality.

On an optical disc as described above, there are formed a groove track constituting a recording track for information data and a land track constituting a guide track for guiding a light beam such as a laser beam constituting a reproduction beam or recording beam on the groove track. On the land track there are formed land pre-pits (hereinafter, simply referred to as pre-pits) corresponding to pre-information (pre-recording information). The pre-pits are formed prior to shipping of the optical disc and carry pre-information used by the recording/reproduction apparatus during recording/reproduction i.e. address and synchronization information for recognizing position on the groove track.

Furthermore, the groove track is wobbled with a frequency corresponding to the disc rotational speed. The wobbled groove track is formed prior to shipping of the optical disc in the same way as the pre-pits.

When information data is recorded on the optical disc, rotational control of the optical disc with a predetermined speed of rotation is effected by the information recording apparatus extracting the wobbling frequency of the groove track. Also, the information recording apparatus acquires the address information etc. indicating position on the optical disc where the recording information data is to be recorded, by acquiring beforehand pre-information by detecting the pre-pits. The information data is recorded on the corresponding recording position using the address information.

When recording the information data, recording of the information data is effected by forming information pits corresponding to the information data on the groove track by directing a light beam on to it such that the center of the light beam coincides with the center of the groove track. Part of the light beam is concurrently directed on the land track so that pre-information is acquired by detecting the pre-information from the pre-pits using for example a push-pull method, using the reflected light of the part of the light beam that is directed on the land track; a recording clock signal synchronized with the pre-pits is also acquired. Also, the information data to be recorded on the optical disc is divided into respective sync frames (hereinafter, simply referred to as sync) constituting pre-information units. The sync frames usually include synchronization information for achieving synchronization of each of the sync frames with the head position of the frames.

During the recording operation, mark portions and space portions are formed in accordance with a recording pulse signal. More specifically, a space portion corresponds to a binary "0". A mark portion corresponds to a binary "1" which is formed with high output power laser beam. As described above, recording of information data is performed in this way by obtaining a recording clock synchronized with the pre-pits during recording. However, the quality of the pre-pit signal obtained from the mark portions is lower than that of the signal obtained from the space portions, due to changes in the amount of light of the recording pulse signal and changes in the coefficient of reflection produced by the pits. Consequently, only the pre-pit information of the space portions is extracted and utilized using gate circuitry or the like. However, as shown in FIG. 1, when a pre-pit pulse is extracted matching the space portions of the recording pulse signal, in some cases only a pre-pit pulse (PA) of incomplete shape is obtained. If a recording clock generated using such a pulse (PA) is employed, loss of synchronization or synchronization errors is produced, causing faults or a decrease in accuracy during recording and reproduction.

OBJECT AND SUMMARY OF THE INVENTION

The present invention was made to overcome the above-described problems described above, and it is an object of the present invention to provide an optical recording media recording apparatus of high performance wherein recording of information data can be achieved without misalignment of the recording position.

To achieve the object, according to one aspect of the present invention, there is provided a recording apparatus for optical recording media in which pre-pits which carry recording position information are formed in advance and a data signal is recorded in accordance with the recording position information, which comprises a gate signal generating section for generating a gate signal in accordance with the data signal; a pre-pit signal generating section for generating a pre-pit signal from a signal read from the optical recording medium; a gate circuit for generating a pre-pit pulse train by allowing the pre-pit signal to pass therethrough in response to the gate signal; a pulse extractor for extracting pulses of predetermined waveform from the pre-pit pulse train; and a synchronization signal generating section for generating a recording synchronization signal based on the pulses of predetermined waveform.

BRIEF DESCRIPTION OF THE DRAWINGS

FIG. 9 is a time chart illustrating the operation of the pulse extraction section shown in FIG. 8.

DETAILED DESCRIPTION OF THE PREFERRED EMBODIMENTS

The embodiments of the present invention are described below in detail with reference to the drawings.

First Embodiment

Figure 1:
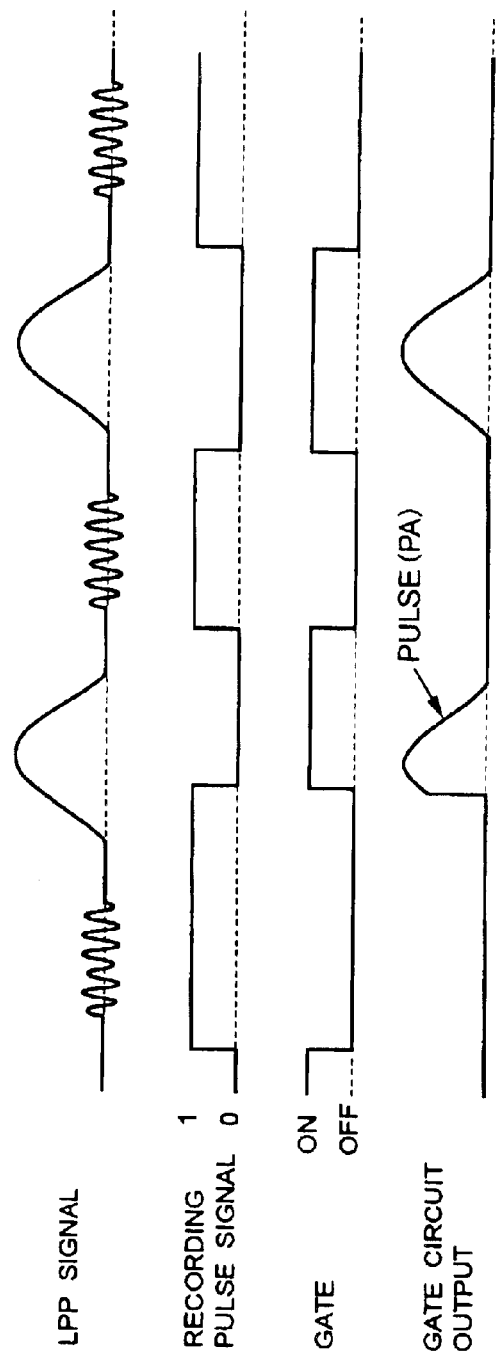
FIG. 1 is a time chart illustrating prior art pre-pit pulse extraction.
Figure 2:
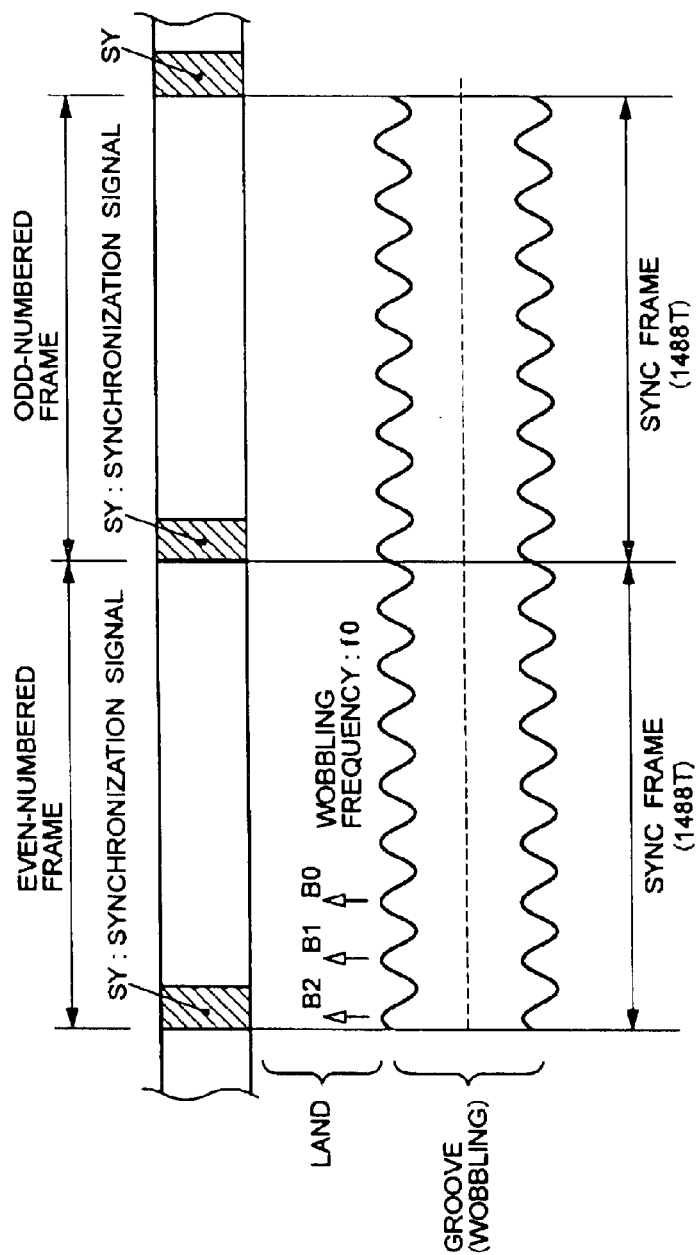
FIG. 2 is a view illustrating schematically a recording format of pre-information preformed on an optical disc.

FIG. 2 illustrates the recording format of pre-information preformed on the optical disc. In FIG. 2, the upper part illustrates the recording format of the recording information data and the waveform of the lower part illustrates schematically the wobbling shape of the groove track (plan view of the groove track) on which the recording information data is recorded. The upwardly directed arrows between the recording format and the wobbling shape of the groove track indicate schematically the positions where pre-pits are formed. In order to facilitate understanding, the wobbling shape of the groove track is exaggerated for purposes of illustration, i.e. illustrated using an amplitude which is larger than the actual amplitude. It should be noted that the recording information data is recorded on the centerline of the groove track.

The data to be recorded on the optical disc is divided in advance in accordance with the sync frames as information units. For example, a single recording sector is formed by 26 sync frames and a single ECC (error correction code) block is formed by 16 recording sectors. A single sync frame has a length of 1488 times (1488 T) the unit length (hereinafter, referred to as T) corresponding to the pit separation defined by the recording format when the aforementioned recording information data is recorded; furthermore, a portion of length 32 T at the head of a single sync frame is employed as synchronization information SY for synchronizing the sync frames.

On the other hand, pre-information recorded on the optical disc is recorded for each sync frame. In more detail, in all cases a single pre-pit (B2 in FIG. 2) indicating the synchronization signal in the pre-information is formed on the land track adjacent to the region where the synchronization information SY in the sync frame is recorded and, in addition, two or one pre-pits (B1 or B0) are formed to indicate the content of the pre-information to be recorded, on the land track adjacent to the front half portion within the sync frame apart from the synchronization information SY (it should be noted that, depending on the content of the pre-information to be recorded, it is also possible for pre-pits to be formed in respect of the front half portion in the sync frame in question apart from the synchronization information SY). The pre-pits have different significance depending on the pattern of the pre-pit sequence B2, B1, B0.

Usually, pre-information is recorded by forming pre-pits only in sync frames of even number (hereinafter, referred to as EVEN frames). That is, in FIG. 2, pre-pits are formed in EVEN frames but no pre-pits are formed in odd-numbered sync frames (ODD frames).

It should be noted that whether the pre-pits are formed in the EVEN frames or the ODD frames of the sync frames is determined dependent on the position of the preceding pre-pits performed on the adjacent land track. In most instances, the pre-pits are formed on the EVEN frames. However, if the pre-pits would be adjacent in the radial direction of the optical disc to pre-pits on the preceding adjacently formed land track when pre-pits were formed on the EVEN frames, the pre-pits are formed on an ODD frame. By such formation, pre-pits in adjacent land track positions are eliminated, so the effect of crosstalk upon pre-pit detection can be reduced.

The groove track is wobbled with a fixed wobbling frequency f0 (frequency obtained by inserting a signal of eight wobbling cycles in a single sync frame) of for example 145 kHz over all of the sync frames. The information recording apparatus detects the signal for rotation control of the spindle motor which rotates the optical disc and generates a clock signal for recording purposes by extracting the fixed wobbling frequency f0.

Figure 3:
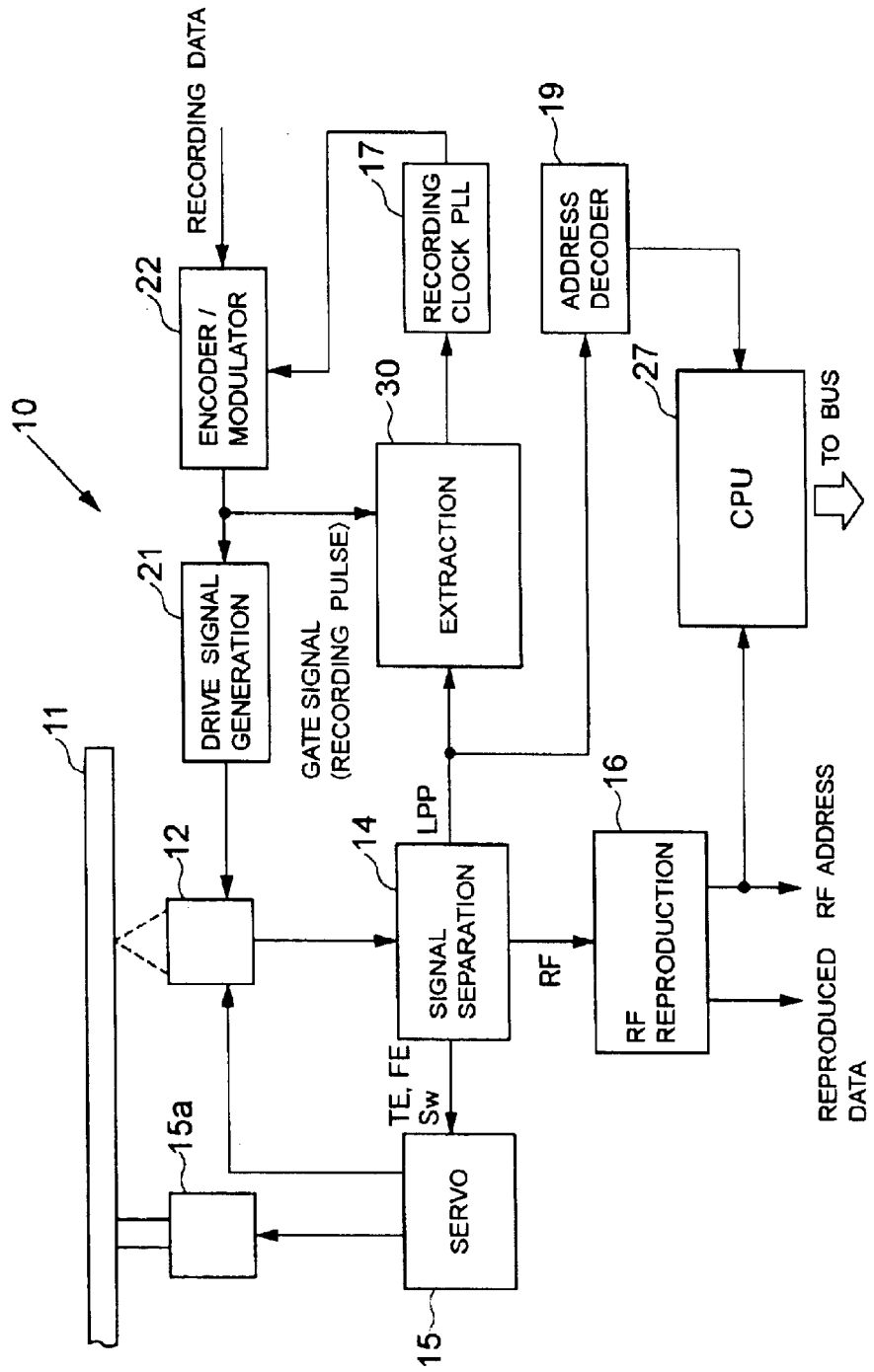
FIG. 3 is a block diagram illustrating the configuration of an optical recording apparatus according to a first embodiment of the present invention.

FIG. 3 is a block diagram illustrating the configuration of an optical recording apparatus 10 according to a first embodiment of the present invention.

A beam of laser light emitted from a laser diode (not shown) constituting a light source provided within an optical pickup 12 is directed onto optical disc 11 such as for example a DVD-R or a DVD-RW. The reflected light beam from the optical disc 11 is detected by a photodetector (not shown) provided in the optical pickup 12 and the detected signal is supplied to a signal separation circuit 14. A tracking error signal, a focus error signal (TE, FE) and a wobble signal (Sw) obtained by the signal separation circuit 14 are supplied to a servo circuit 15. The servo circuit 15 performs a tracking servo action and a focusing servo action by using the signals and control a spindle motor 15a which rotates the optical disc.

The RF signal obtained by the signal separation circuit 14 is supplied to an RF reproduction circuit 16. The RF reproduction circuit 16 decodes the RF signal to generate a reproduced data signal. The signal separation circuit 14 separates the frame synchronization signal (sync signal) and RF address signal from the RF read signal and supplies the signals to a processor (CPU) 27. The CPU 27 exchanges various signals with various sections or circuits provided in the recording apparatus 10 through a bus (not shown) and thereby controls the entire recording apparatus 10.

Also, the signal separation circuit 14 separates the pre-pit signal (LPP signal) containing the pre-pit pulse train and supplies the signal to a pulse extraction section 30. The pulse extraction section 30 extracts pulses that satisfy predetermined conditions and supplies these to a recording clock PLL circuit 17. The recording clock PLL circuit 17 generates a recording clock signal based on the pulse signal i.e. on the positions of the pre-pits and supplies the signal to a data encoder/modulator 22. The recording data signal that is to be recorded is supplied to a data encoder/modulator 22. The data encoder modulator 22 performs ECC coding and 8/16 modulation on the recording data signal. The modulated signal generated by the modulation is a recording pulse signal (NRZI signal) i.e. a binary pulse signal in which mark and space are alternately repeated. The drive signal for driving the light source in the optical pickup 12 is generated by supplying the recording pulse signal to a drive signal generating circuit 21. In the drive signal, the mark portions are constituted by intermittent highlow pulses. Data recording is effected by driving the light source using the drive signal. Also, binary recording pulse signals from the data encoder/modulator 22 mentioned above are supplied to the pulse extraction section 30. Alternatively, the signals are supplied to the pulse extraction section 30 as an inverted gate signal, to be described.

The pre-pit signal from the signal separation circuit 14 is also supplied to an address decoder 19, where a signal representing the address position on the disc is generated using the pre-pit pattern. The address signal generated by the address decoder 19 is sent to the CPU 27.

Figure 4:
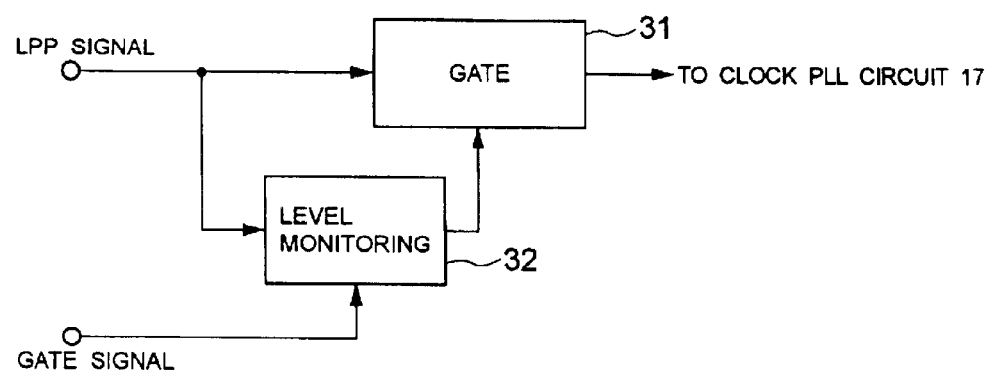
FIG. 4 is a block diagram illustrating an example of the circuit configuration of a pulse extraction section of an optical recording apparatus according to the first embodiment.
Figure 5:
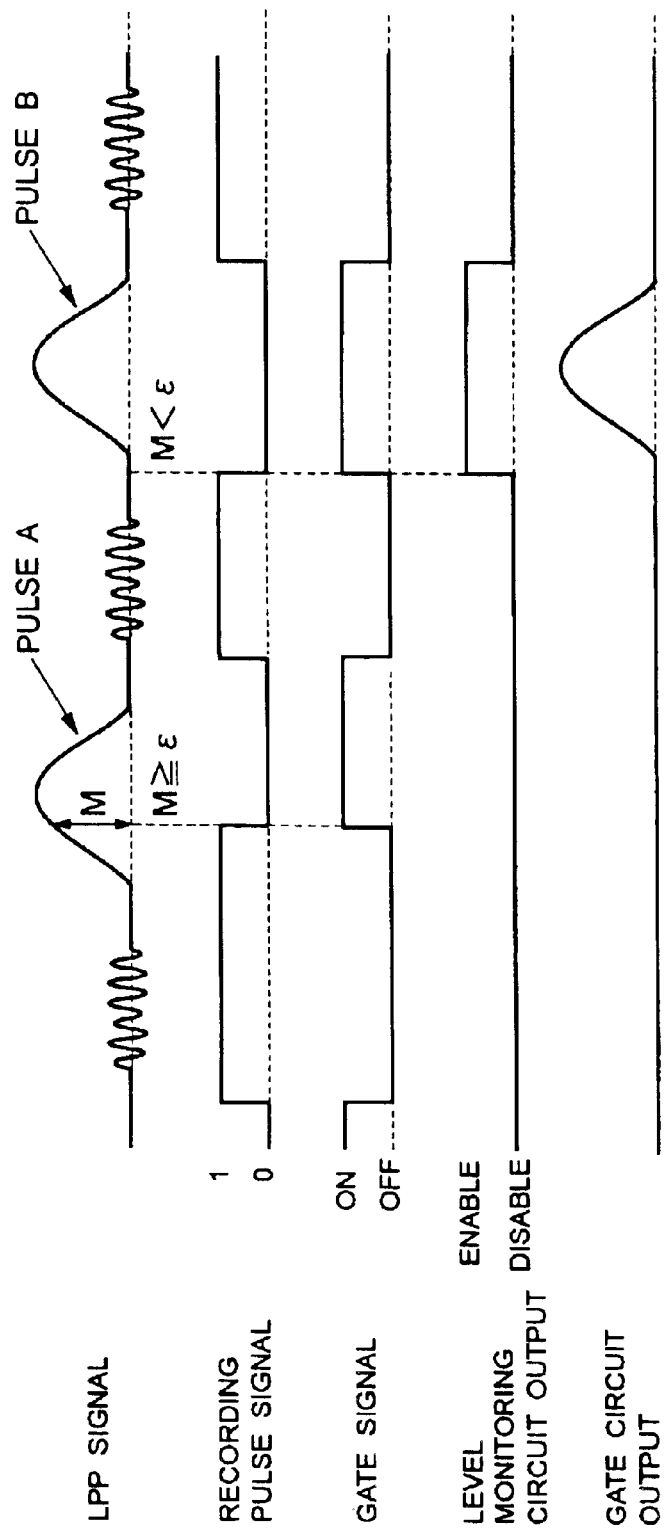
FIG. 5 is a time chart illustrating the operation of the pulse extraction section shown in FIG. 4.

The pulse extraction section 30 can be implemented by various types of circuit configuration. FIG. 4 shows an example of such a circuit configuration and FIG. 5 is a time chart illustrating the operation during recording operation. As shown in FIG. 4, the pulse extraction section 30 comprises a gate circuit 31 and a level monitoring circuit 32. Pre-pit (LPP) signals from the signal separation circuit 14 are supplied to the gate circuit 31 and the level monitoring circuit 32. As described above, during recording operation, a gate signal according to the recording data signal is supplied to the level monitoring circuit 32.

The level monitoring circuit 32 monitors the magnitude (M) of the pre-pit signal at the time of the rise of the gate signal. The level monitoring circuit 32 sends a signal to the gate circuit 31 putting the gate circuit 31 in a disabled condition if M is greater than or equal to a predetermined value ($\epsilon$) and thereby cutting off supply of the pre-pit signal to the clock PLL circuit 17. In this way, if the pre-pit signal is in a condition in which it has already risen at the time where the gate signal turns on, the pre-pit signal (i.e. pulse A) is cut off. The level monitoring circuit 32 only enables the gate circuit 31 when M is less than the predetermined value ($\epsilon$), causing the pre-pit signal to be supplied to the clock PLL circuit 17. In this way, a pulse B is supplied to the clock PLL circuit 17. Consequently, since a pulse (A) of incomplete shape is not used to generate the recording clock, there is no possibility of loss of synchronization or synchronization errors being produced and lowered accuracy or faults during recording can thereby be avoided.

Second Embodiment

Figure 6:
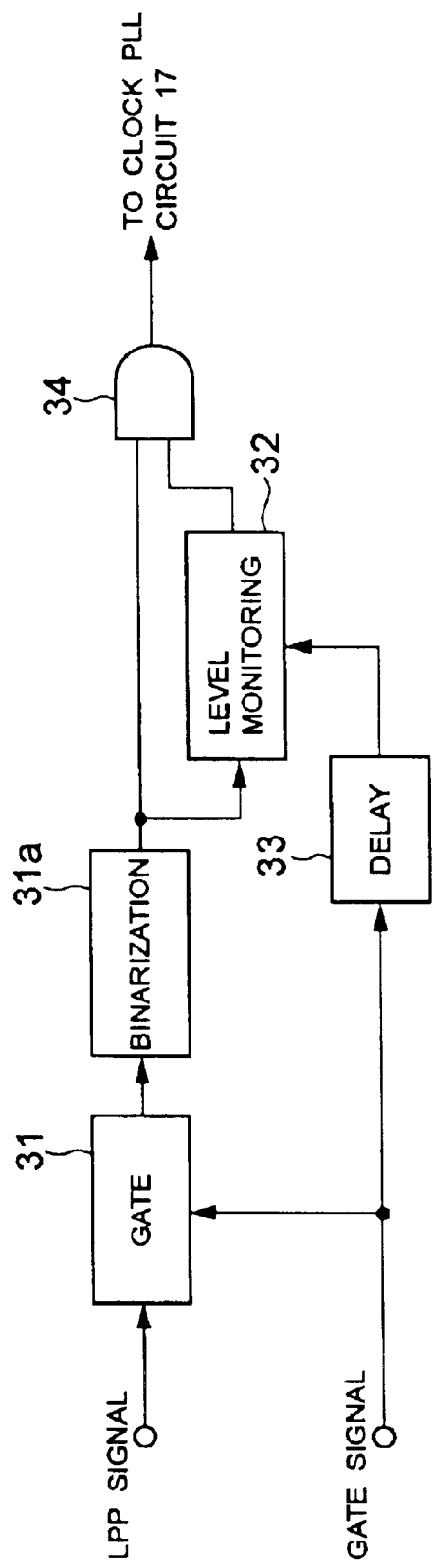
FIG. 6 is a block diagram illustrating the circuit configuration of the pulse extraction section of an optical recording apparatus according to a second embodiment.
Figure 7:
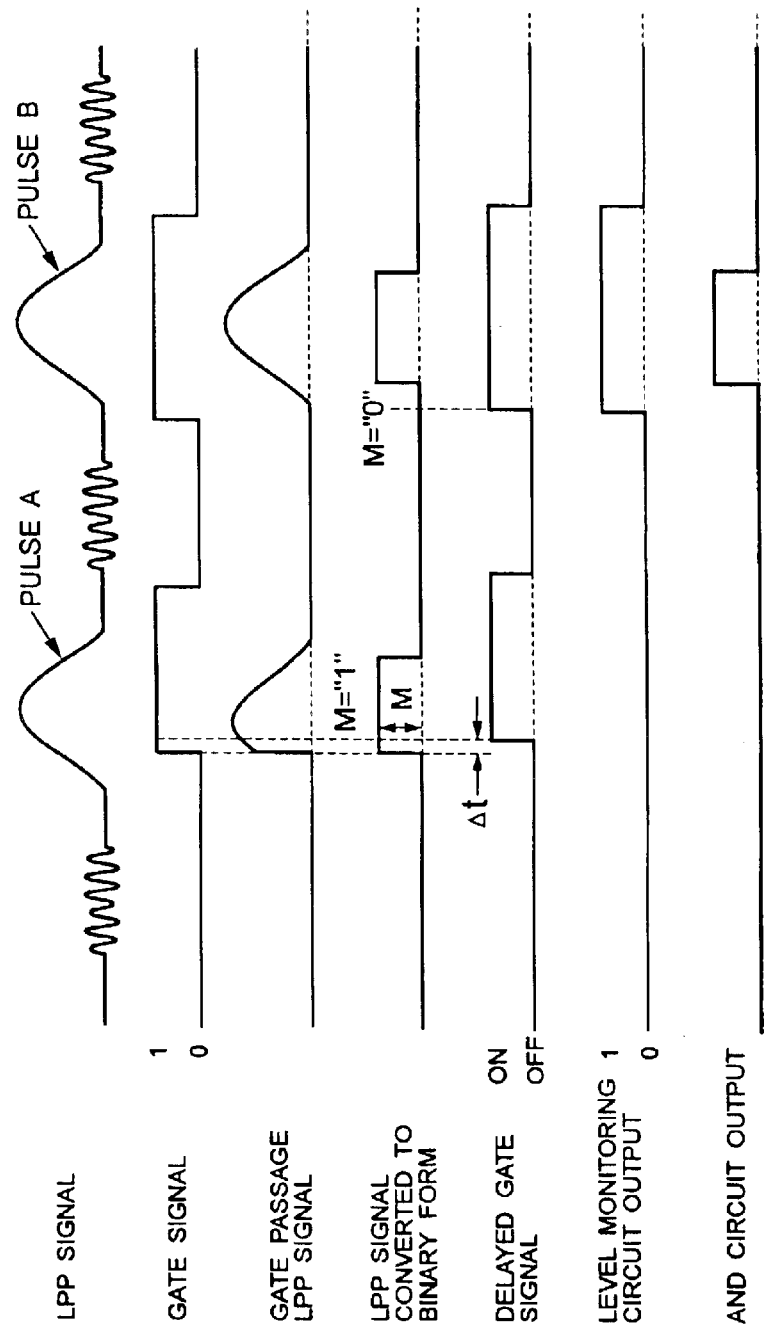
FIG. 7 is a time chart illustrating the operation of the pulse extraction section shown in FIG. 6.

FIG. 6 is a block diagram illustrating the circuit configuration of the pulse extraction section 30 of the optical recording apparatus 10 according to a second embodiment of the present invention. Also, FIG. 7 is a time chart illustrating its operations. The pre-pit signal is supplied to the gate circuit 31 and the pre-pit signal that has passed through the gate circuit 31 is converted to a binary signal by a binary conversion circuit 31a. In addition, after being delayed by a predetermined time ($\Delta t$) by a delay element 33, the gate signal is supplied to the level monitoring circuit 32. The level monitoring circuit 32 monitors the magnitude M of the pre-pit signal which has thus been converted into a binary form (binary LPP signal) at the time of the rise of the delayed gate signal and determines whether M corresponds to a logic level "1 (high)" or corresponds to a "0 (low)". If M corresponds to a logic level "1", the level monitoring circuit 32 supplies a logic output of logic level "0" and if it corresponds to a logic level "0" supplies a pulse output of logic level "1" to an AND circuit 34. The pulse output of the logic level "1" may have the same time-width as the gate signal pulse or may be a pulse of predetermined separation. The AND circuit 34 cuts off supply of the binary pre-pit signal to the clock PLL circuit 17 when the logic signal is "0" but supplies the binary pre-pit signal to the clock PLL circuit 17 when the logic signal is "1". Since the time at which the magnitude M of the pre-pit signal is determined is delayed, it is possible to determine the rise of the pre-pit signal in a reliable fashion. Consequently, since a pulse (A) of incomplete shape as described above is not employed for clock generation, there is no possibility of loss of synchronization or synchronization error and lowered accuracy or faults during recording and reproduction can be avoided.

Also, although, by way of example, the case was described in which the binary conversion circuit 31a that converts the pre-pit signal to a binary signal was employed, a configuration could be adopted in which analogue signal processing is performed without conversion to binary form.

Third Embodiment

Figure 8:
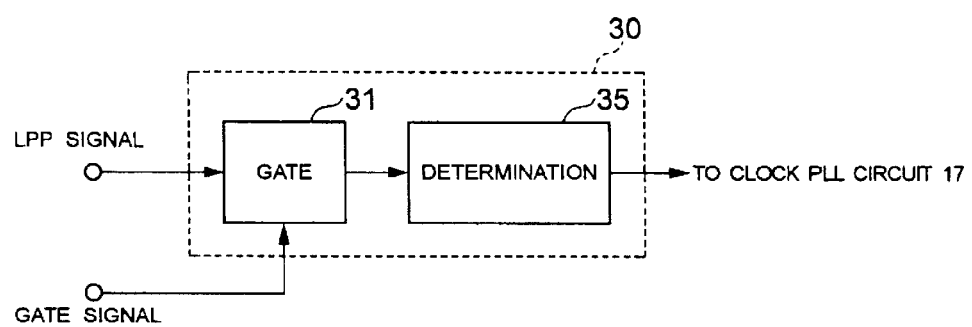
FIG. 8 is a block diagram illustrating the circuit configuration of the pulse extraction section of an optical recording apparatus according to a third embodiment.

FIG. 8 is a block diagram illustrating the circuit configuration of a pulse extraction section 30 of an optical recording apparatus 10 according to a third embodiment of the present invention. Also, FIG. 9 is a time chart illustrating its operation. In this embodiment, the pre-pit signal is supplied to the gate circuit 31. The gate circuit 31 is respectively turned ON or OFF in response to the gate signal "1" or "0". The signal passing through the gate circuit 31 is supplied to a determination circuit 35. Specifically, a pre-pit pulse train comprising pulses PA, PB respectively corresponding to the pulses A, B in the pre-pit signal is supplied. The determination circuit 35 determines whether the pulses in the pre-pit pulse train satisfy a predetermined waveform condition and supplies only pulses satisfying the predetermined waveform condition (pulses PB in FIG. 9) to clock PLL circuit 17.

The determination can be achieved by various types of generally used circuit configuration. For example, this could be achieved by evaluating the pulse width, the pulse height (or intensity) or pulse symmetry etc and comparing with those of a standard pulse waveform. The determination circuit 35 may therefore be provided with necessary processing circuitry such as sampling circuitry or averaging circuitry etc.

Also, a predetermined pulse waveform may be employed as the standard pulse waveform. Alternatively, pulse waveforms in pre-pit pulse trains obtained as output of gate circuit 31 during recording or during reproduction may be evaluated and a standard pulse waveform determined among the pulse waveforms. Such evaluation maybe implemented by hardware or may be implemented as software for example in the CPU 27.

Although the first and second embodiment described above were described for the cases where determination of the magnitude of the pre-pits was performed at the time of the rise, these examples are preferably applied when it is desired to effect operation taking the rising portion (or the rising edge after conversion to binary form) of the pre-pit signal at the downstream end of the extraction circuit as reference.

Also, apart from this, when it is desired to effect operation taking the falling part or the peak part of the pre-pit signal at the downstream end of the extraction circuit as reference, it is necessary to use an extraction circuit capable of extracting exclusively precisely the falling part or the peak part, respectively. The basic technical concept is identical with that of the embodiments described with reference to the rising part. However, since there are differences regarding the detailed specific configuration, a supplementary description is given below.

First of all, when the falling part of the pre-pit signal is needed, a delay circuit is provided for example after the branching of the pre-pit signal of FIG. 4 at level monitoring circuit 32 and upstream of the gate circuit 31. The amount of delay of the delay circuit may be set so as to delay the pre-pit signal by about the amount of one wave. The gate circuit 31 may then be controlled in the same way as in the first embodiment by monitoring the magnitude (M) of the pre-pit signal at the time of the fall of the gate signal. Specifically, the fall is made the subject of monitoring and the delay circuit is arranged to produce a delay of the amount of the time required for making the decision.

Also, if the peak part of the pre-pit signal is required, for example the pre-pit signal of FIG. 6 is supplied to the gate circuit 31 after passage through a differentiating circuit. The pre-pit signal is thereby converted into a signal whose polarity is inverted about the peak point as center; this signal is converted to binary form by the binary conversion circuit 31a using as a reference value which is somewhat lower than 0 level, so as to generate a binary differentiated signal that falls in the inverted part corresponding to the peak of the pre-pit signal and that is ON (=1) at or above the reference value. By supplying a signal obtained by inverting the binary differentiated signal to level monitoring circuit 32 and the AND circuit 34, an output indicating the peak point of the pre-pit signal is obtained from the AND circuit 34.

Also, if, in addition to timing information such as synchronization, other information such as for example address information is conferred on the pre-pit signal by its presence, as in a case of a DVD-R etc, preferably the signal that has passed through the pulse extraction section 30 as shown in FIG. 3 is output to the recording clock PLL circuit 17 and, furthermore, the pre-pit signal that is output from the signal separation circuit 14 prior to passage through the pulse extraction section 30 is arranged to be output to an address converter. In this way, in systems where the timing obtained from the pre-pit signal is important, this can be supplied with inaccurate information removed therefrom and, in the systems where the presence of a pre-pit signal is important, the pre-pit signal can be supplied before extraction by the extraction section 30, so supply of a signal which is desirable in each system can be achieved.

Also, in systems where timing such as that of the recording clock PLL circuit 17 is important, until a stable condition, in which synchronization is ensured, has been reached or if an unstable condition has been produced, supply of the pre-pit signal may be arranged to be received directly from the signal separation circuit 14 rather than going through the extraction section 30. In this way, for timings where the presence of a pre-pit signal is important, the pre-pit signal can be supplied before being extracted by the extraction section 30. This therefore makes it possible to receive supply of a signal that is desirable in accordance with the circumstances.

It should be noted that the various types of the pulse extraction section illustrated in the embodiments ascribed above could be applied after being suitably modified or suitably combined.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2001-56274 which is hereby incorporated by reference.

What is claimed is:

1. A recording apparatus for optical recording media in which pre-pits which carry recording position information are formed in advance and a data signal is recorded in accordance with said recording position information, comprising:

a gate signal generating section for generating a gate signal in accordance with said data signal;

a pre-pit signal generating section for generating a pre-pit signal from a signal read from said optical recording medium;

a gate circuit for generating a pre-pit pulse train by allowing said pre-pit signal to pass therethrough in response to said gate signal;

a pulse extractor for extracting pulses of predetermined waveform from said pre-pit pulse train; and a synchronization signal generating section for generating a recording synchronization signal based on said pulses of predetermined waveform.

2. The recording apparatus according to claim 1, wherein said pulse extractor detects the magnitude of said pre-pit signal at the time of switching in said gate circuit to extract the pulses by using the detection result.

3. The recording apparatus according to claim 1, wherein said pulse extractor extracts the pulses according to the magnitude of said pre-pit signal at a point of time delayed by a predetermined time from said switching time.

4. The recording apparatus according to claim 1, comprising an address decoder for generating address information from said pre-pit signals, wherein pre-pit signals outputted from said pre-pit signal generating section are supplied to said address decoder without passing through said gate circuit.

* * * * *